(12) United States Patent
Yoshida et al.

(10) Patent No.: US 10,861,149 B2
(45) Date of Patent: Dec. 8, 2020

(54) INSPECTION SYSTEM AND METHOD FOR CORRECTING IMAGE FOR INSPECTION

(71) Applicant: Fanuc Corporation, Yamanashi (JP)

(72) Inventors: Junichirou Yoshida, Yamanashi (JP); Fumikazu Warashina, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 149 days.

(21) Appl. No.: 16/107,485

(22) Filed: Aug. 21, 2018

(65) Prior Publication Data
US 2019/0066287 A1    Feb. 28, 2019

(30) Foreign Application Priority Data
Aug. 28, 2017    (JP) .................... 2017-162981

(51) Int. Cl.
*G06T 7/00*    (2017.01)
*G06T 7/73*    (2017.01)
(Continued)

(52) U.S. Cl.
CPC ............ *G06T 7/001* (2013.01); *G01B 11/254* (2013.01); *G01B 11/2504* (2013.01); (Continued)

(58) Field of Classification Search
CPC .. G06T 7/12; G06T 7/74; G06T 7/337; G06T 7/90; G06T 2207/10024;
(Continued)

(56) References Cited

U.S. PATENT DOCUMENTS 5,978,521 A * 11/1999 Wallack ............... G01B 11/002
                                                     382/287
7,119,351 B2 * 10/2006 Woelki ................... B23K 26/04
                                                     250/559.4
(Continued)

FOREIGN PATENT DOCUMENTS

JP    S62-142490 A    6/1987
JP    H10-300682 A   11/1998
(Continued)

OTHER PUBLICATIONS

Japan Patent Office, Office Action dated Feb. 26, 2019 for Japan Patent Application No. 2017-162981.
(Continued)

*Primary Examiner* — Sean T Motsinger
(74) *Attorney, Agent, or Firm* — Shackelford, Bowen, McKinley & Norton, LLP (57) ABSTRACT

An inspection system includes a first imaging device provided in a first inspection device; a second imaging device provided in a second inspection device; a first controller; and a second controller, wherein the first controller acquires a particular feature of a calibration jig, which is positioned in the first inspection device, from an image of the calibration jig obtained by the first imaging device as first feature data, and the second controller acquires the particular feature of the calibration jig, which is positioned in the second inspection device, from an image of the calibration jig obtained by the second imaging device as second feature data. The correction amount needed for correcting the image obtained by the second imaging device so that the second feature data matches the first feature data is acquired, and the second inspection device corrects an image of an inspection subject using this correction amount.

8 Claims, 7 Drawing Sheets

(51) Int. Cl.
*G06T 7/90* (2017.01)
*G01B 11/25* (2006.01)
*G06T 7/12* (2017.01)
*G06T 7/33* (2017.01)
*G01N 21/93* (2006.01)
*G01N 21/88* (2006.01)

(52) U.S. Cl.
CPC ...... *G01B 11/2522* (2013.01); *G01N 21/8851* (2013.01); *G01N 21/93* (2013.01); *G06T 7/12* (2017.01); *G06T 7/337* (2017.01); *G06T 7/74* (2017.01); *G06T 7/90* (2017.01); *G06T 2207/10024* (2013.01); *G06T 2207/30108* (2013.01)

(58) Field of Classification Search
CPC ...... G06T 2207/30108; G01B 11/2504; G01B 11/2522; G01B 11/254; G01N 21/8851; G01N 21/93
See application file for complete search history.

(56) References Cited

U.S. PATENT DOCUMENTS

| | | |
|---|---|---|
| 2004/0218806 A1 | 11/2004 | Miyamoto et al. |
| 2017/0032537 A1* | 2/2017 | Li ..................... H04N 17/002 |
| 2017/0111580 A1* | 4/2017 | Chang ............... H04N 5/23238 |
| 2017/0132807 A1* | 5/2017 | Shivaram ............. B25J 9/1692 |
| 2017/0339395 A1* | 11/2017 | Hall .................... H04N 13/239 |
| 2017/0371123 A1* | 12/2017 | Wang ................... G06T 7/001 |
| 2019/0066287 A1* | 2/2019 | Yoshida .............. G01B 11/2522 |
| 2019/0108653 A1* | 4/2019 | Virodov ................ G06T 7/85 |
| 2019/0290371 A1* | 9/2019 | Calef .................. H04N 13/106 |
| 2020/0065995 A1* | 2/2020 | Shivaram ............. B25J 9/1692 |

FOREIGN PATENT DOCUMENTS

| | | |
|---|---|---|
| JP | 2000-106389 A | 4/2000 |
| JP | 2002-181732 A | 6/2002 |
| JP | 2004-047939 A | 2/2004 |
| JP | 2004-163174 A | 6/2004 |
| JP | 2008-209211 A | 9/2008 |
| JP | 2010-032260 A | 2/2010 |
| JP | 2010-239041 A | 10/2010 |

OTHER PUBLICATIONS

Hirata, Yoshinori; Notice of Reasons for Refusal for Japanese Patent Application No. 2017-162981; dated Oct. 29, 2019; 3 pages.

\* cited by examiner

INSPECTION SYSTEM AND METHOD FOR CORRECTING IMAGE FOR INSPECTION

CROSS-REFERENCE TO RELATED APPLICATIONS

This application is based on and claims priority to Japanese Patent Application No. 2017-162981 filed on Aug. 28, 2017, the entire content of which is incorporated herein by reference.

TECHNICAL FIELD

The present invention relates to an inspection system and a method for correcting an image for inspection.

BACKGROUND ART

There is known an inspection device with which an inspection subject is imaged by using an imaging device, the obtained image is subjected to image processing, and inspection is performed by using the processed image (for example, refer to PTL 1).

CITATION LIST

Patent Literature

{PTL 1} Japanese Unexamined Patent Application, Publication No. 2002-181732

SUMMARY OF INVENTION

A first aspect of the present invention provides an inspection system including: a first imaging device provided in a first inspection device; a first controller that processes an image of an inspection subject, which is positioned at a particular position in the first inspection device, so that the image can be used for inspection, the image being obtained by the first imaging device; a second imaging device provided in a second inspection device; and a second controller that processes an image of an inspection subject, which is positioned at a particular position in the second inspection device, so that the image can be used for inspection, the image being obtained by the second imaging device, wherein the first controller conducts a first calibration data acquiring process that acquires a particular feature of a calibration jig, which is positioned at the particular position in the first inspection device, from an image of the calibration jig obtained by the first imaging device, and stores the particular feature as first feature data; wherein the second controller conducts: a second calibration data acquiring process that acquires the particular feature of the calibration jig, which is positioned at the particular position in the second inspection device, from an image of the calibration jig obtained by the second imaging device, and stores the particular feature as second feature data; and an image correction amount acquiring process that corrects the image of the calibration jig obtained by the second imaging device so that the second feature data matches the first feature data, and acquires a correction amount to correct the image, wherein the second controller corrects the image of the inspection subject by using the correction amount.

A second aspect of the present invention provides a method for correcting an image for inspection, the method including: a first calibration data acquiring step of obtaining an image of a calibration jig, which is positioned at a particular position in a first inspection device, by using a first imaging device of the first inspection device, and acquiring, as first feature data, a particular feature of the calibration jig in the obtained image; a second calibration data acquiring step of obtaining an image of the calibration jig, which is positioned at a particular position in a second inspection device, by using a second imaging device of the second inspection device, and acquiring, as second feature data, the particular feature of the calibration jig in the obtained image; an image correction amount acquiring step of correcting the image of the calibration jig obtained by the second imaging device so that the second feature data matches the first feature data, and acquiring a correction amount for correcting the image; and an inspection image correcting step of correcting, by using the correction amount, the image of an inspection subject, which is positioned at the particular position in the second inspection device, obtained by the second imaging device.

DESCRIPTION OF EMBODIMENTS

An inspection system according to an embodiment of the present invention will now be described with reference to the drawings.

Figure 1:
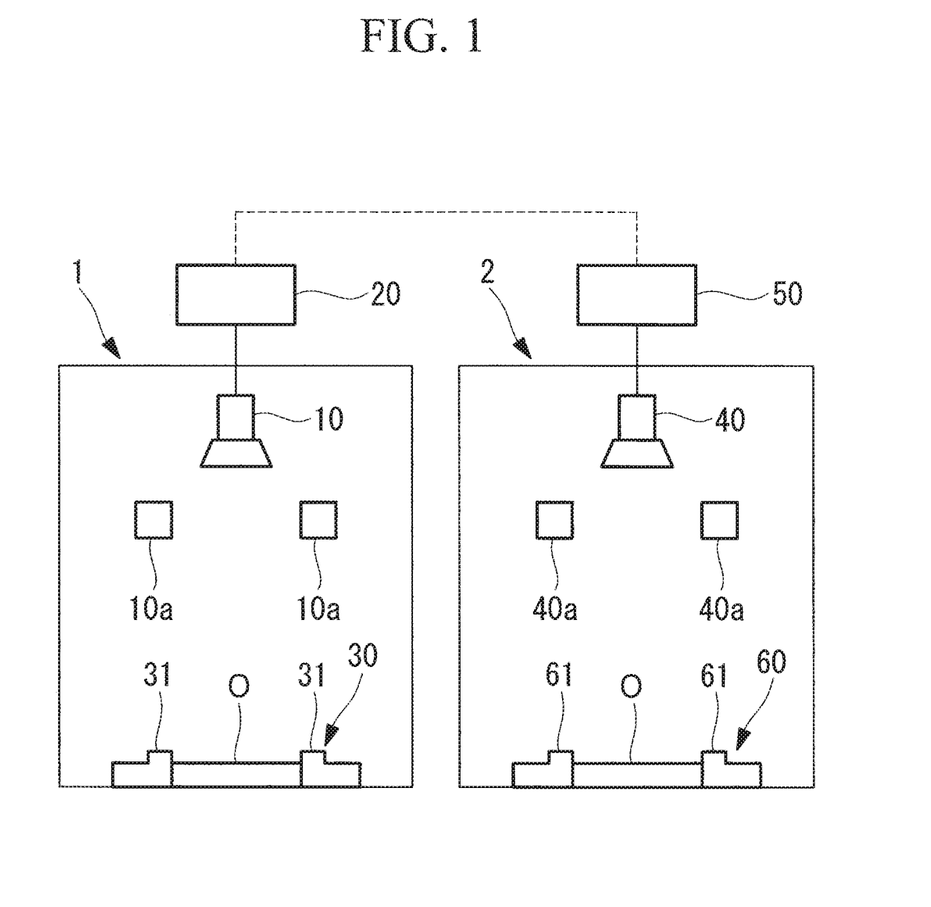
FIG. 1 is a schematic diagram of an inspection system according to an embodiment of the present invention.

As illustrated in FIG. 1, the inspection system has a first inspection device 1 and a second inspection device 2. In this embodiment, the first inspection device 1 functions as a master device, and the second inspection device 2 functions as a slave device. In this embodiment, only one second inspection device 2 is illustrated, but two or more inspection devices 2 may be provided. In such a case, the operation of the second inspection devices 2 is the same as the operation described below.

As illustrated in FIG. 1, the first inspection device 1 is equipped with a first imaging device 10, such as a camera, having a lighting device 10a and the like, a first control unit 20 connected to the first imaging device 10, and a positioning device 30 that positions an inspection subject O to be imaged by the first imaging device 10. The second inspection device 2 is equipped with a second imaging device 40, such as a camera, having a lighting device 40a and the like, a second control unit 50 connected to the second imaging device 40, and a positioning device 60 that positions an inspection subject O to be imaged by the second imaging device 40.

As illustrated in FIG. 1, the positioning device 30 of the first inspection device 1 is equipped with, for example, multiple positioning members 31 that position the inspection subject O in the horizontal direction, and the positioning members 31 hold the inspection subject O in the horizontal direction to position the inspection subject O. In the same manner, the positioning device 60 of the second inspection device 2 is configured so that the inspection subject O is held between positioning members 61.

Figure 2:
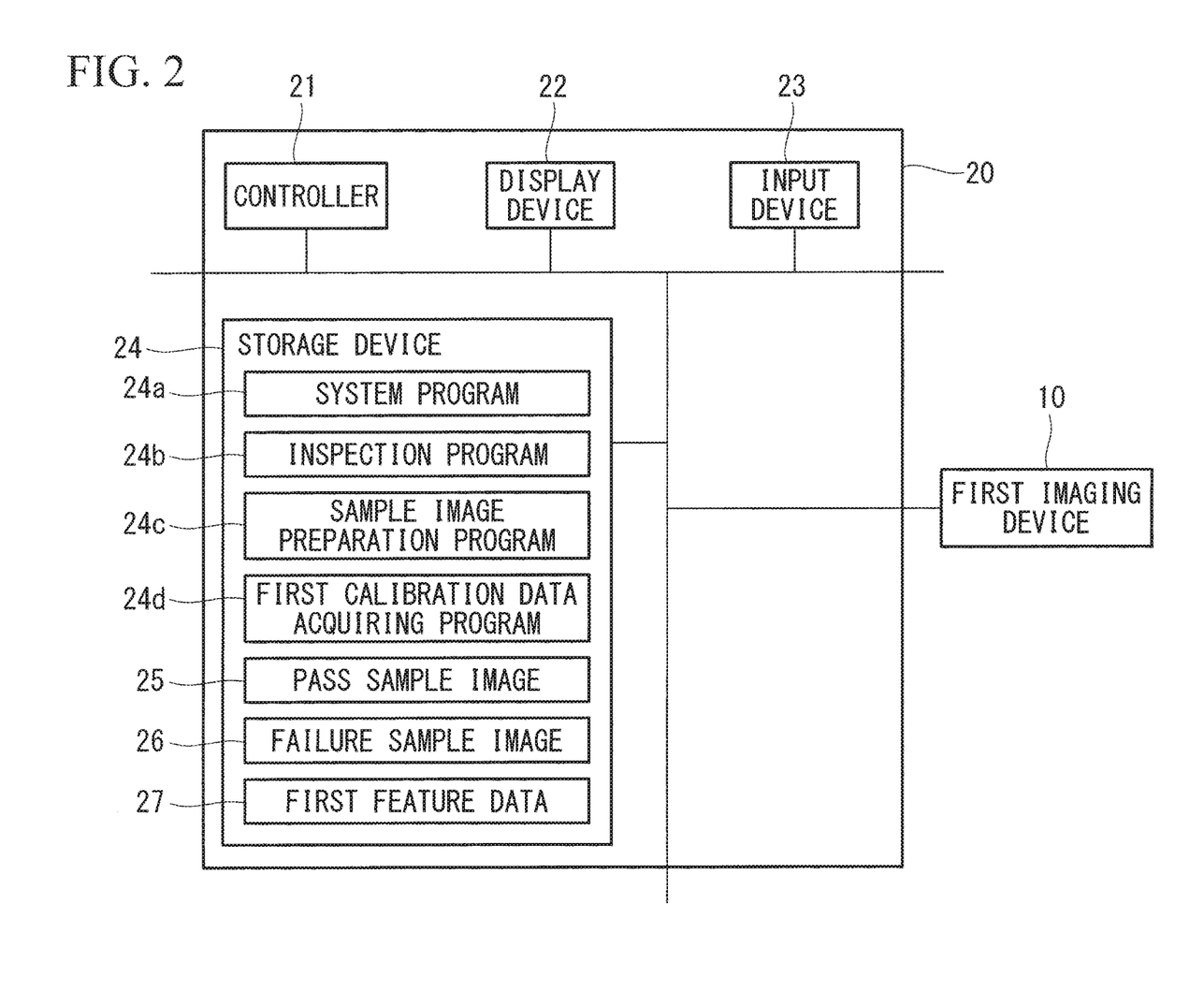
FIG. 2 is a block diagram of a control unit of a first inspection device of the inspection system of this embodiment.

As illustrated in FIG. 2, the first control unit 20 is equipped with, for example, a controller 21 having a CPU, a RAM, and etc., a display device 22, an input device 23, and a storage device 24 having a nonvolatile storage, a ROM, and etc.

The storage device 24 stores a system program 24a, and the system program 24a is responsible for basic functions of the first control unit 20. The storage device 24 also stores an inspection program 24b for carrying out inspection of the inspection subject O, a sample image preparation program 24c, and a first calibration data acquiring program 24d serving as a first calibration data acquiring means. The inspection program 24b also functions as a first image processing means.

The storage device 24 also stores various pass sample images 25 and failure sample images 26 that are obtained by imaging a plurality of inspection subjects O in various states. For example, when the inspection subject O is a substrate, various pass sample images 25 and failure sample images 26 are stored for each of the types of components mounted on the substrate. For example, each of the pass sample images 25 has a shape, position, orientation, and state of the component within the standard values, and each of the failure sample images 26 has a shape, position, orientation, and state of the component, at least one of which is outside the standard values. There is no need to store both the pass sample images 25 and the failure sample images 26, and only one of them may be stored.

The controller 21 operating in accordance with the sample image preparation program 24c stores the pass sample images 25 and the failure sample images 26 in the storage device 24. For example, when a command for preparing sample images is input through the input device 23, the controller 21 controls the display device 22 to display an indication that confirms whether or not installation of the substrate, i.e., a sample, on the positioning device 30 is completed. When the controller 21 receives, from the input device 23 or the like, the information indicating completion of installation of the sample on the positioning device 30, the controller 21 controls the first imaging device 10 to image the sample.

Subsequently, the controller 21 stores, in the storage device 24, the obtained images along with the pass/failure information, and these images constitute the pass sample images 25 and the failure sample images 26.

The controller 21 repeats the aforementioned operation so that various pass sample images 25 and failure sample images 26 are stored in the storage device 24.

Here, depending on the aberrations of the optical system of the first imaging device 10, the shape, position, orientation, state, and etc., of the component in the obtained image are sometimes different from what they actually are. For example, a component positioned at an end of the viewing field of the first imaging device 10 is imaged to have a shape, position, orientation, and etc. which are different from what they actually are due to the aberrations of the optical system.

Even in this case, since various pass sample images 25 and failure sample images 26 of the component positioned at this position are stored in the storage device 24 as described above, and since these sample images 25 and 26 reflect the same aberrations of the optical system of the first imaging device 10, the pass/failure determination of that component can be appropriately carried out during inspection.

The controller 21 operating in accordance with the inspection program 24b inspects the inspection subject O. For example, when a command to start inspection is input through the input device 23, the controller 21 controls the first imaging device 10 to image the inspection subject O positioned by the positioning device 30, conducts known image processing on the obtained image, and carries out pass/fail determination on each of the components on the inspection subject O. The image processing may involve, for example, preparing a difference image of the obtained image and the pass sample images, and determining that the component fails when the difference is large.

Another example is a method that involves identifying the positions of the individual components through pattern matching by normalized correlation. The pass/failure determination is made by comparing the positions of the components identified in the obtained image and the positions of the components identified in the pass sample images.

Figure 3:
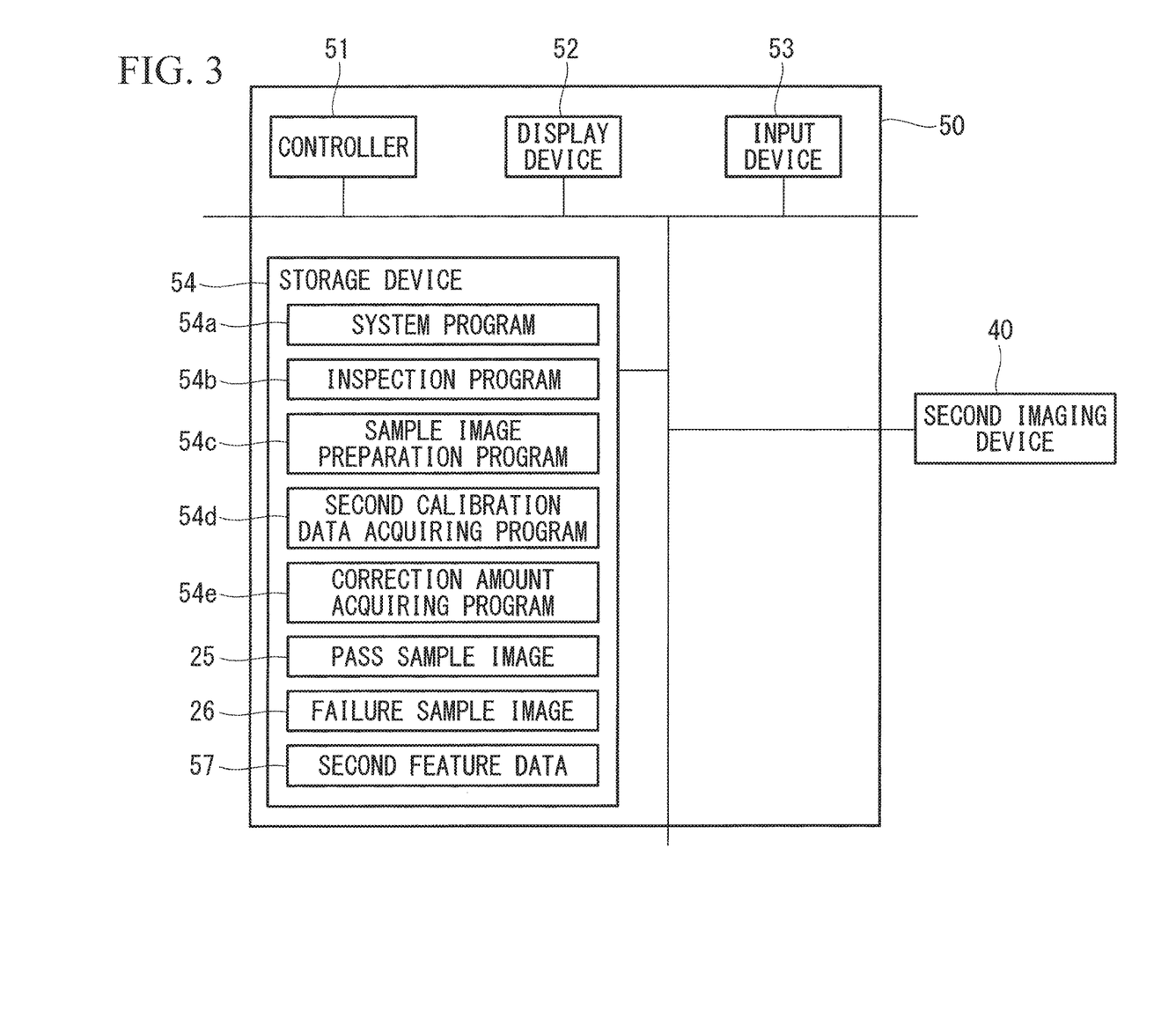
FIG. 3 is a block diagram of a control unit of a second inspection device of the inspection system of this embodiment.

On the other hand, as illustrated in FIG. 3, the second control unit 50 is equipped with, for example, a controller 51 having a CPU, a RAM, and etc., a display device 52, an input device 53, and a storage device 54 having a nonvolatile storage, a ROM, and etc.

The storage device 54 stores a system program 54a, and the system program 54a is responsible for basic functions of the second control unit 50. The storage device 54 also stores an inspection program 54b for carrying out inspection of the inspection subject O, a sample image preparation program 54c, a second calibration data acquiring program 54d serving as a second calibration data acquiring means, and a correction amount acquiring program 54e serving as an image correction amount acquiring means. The inspection program 54b also functions as a second image processing means.

The sample image preparation program 54c of the second control unit 50 is different from the sample image preparation program 24c of the first control unit 20. The controller 51 operating in accordance with the sample image preparation program 24c communicates with the first control unit 20 of the first inspection device 1, receives the pass sample images 25 and the failure sample images 26 stored in the storage device 24 of the first control unit 20, and stores these images in the storage device 54.

Figure 4:
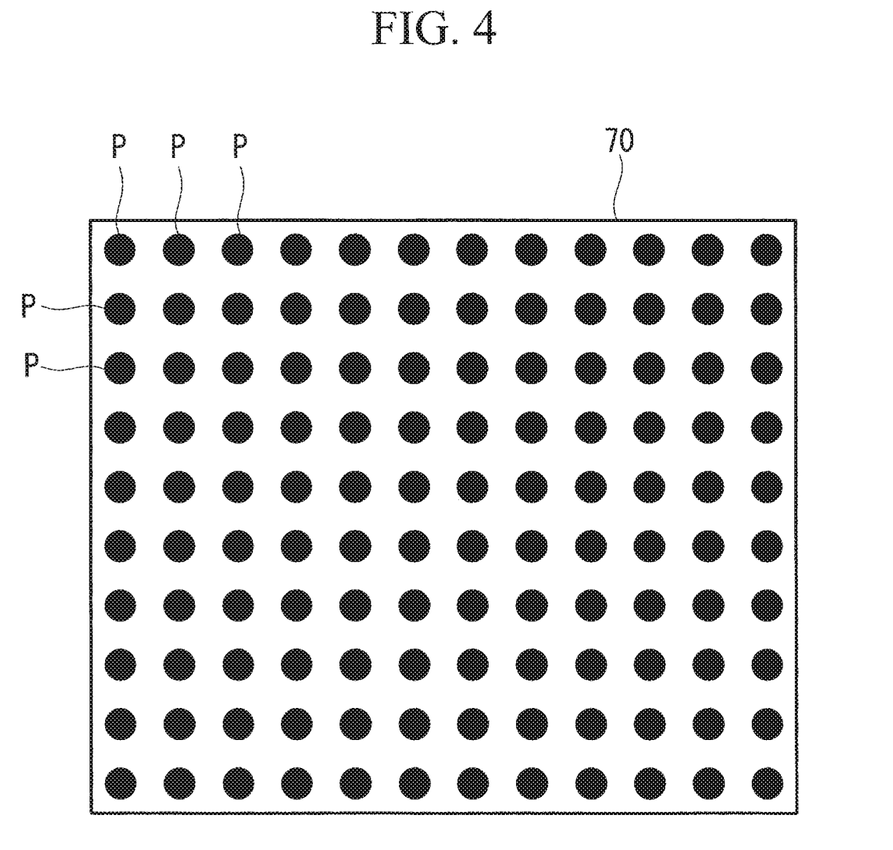
FIG. 4 is a plan view of a calibration jig used in the inspection system of this embodiment.

The second calibration data acquiring program 54d of the second control unit 50 acquires particular features of a calibration jig 70 positioned by using the positioning device 60. In this embodiment, as illustrated in FIG. 4, the calibration jig 70 is a plate-shape member having an upper surface on which multiple points P are arranged in square grids. Note that the calibration jig 70 is not limited to a member on which circular points P are drawn. For example, a checkerboard pattern may be drawn on the upper surface of the calibration jig 70, a lattice pattern constituted by lines may be drawn on the upper surface of the calibration jig 70, or the points P may be arranged in a close-packed hexagonal lattice pattern.

Here, the first calibration data acquiring program 24d of the first control unit 20 also acquires particular features of the calibration jig 70 positioned by using the positioning device 30.

For example, the controller 51 of the second control unit 50 operates in accordance with the second calibration data acquiring program 54*d*, and, when a command for acquiring the calibration data is input through the input device 53, the controller 51 controls the display device 52 to display an indication that confirms whether or not installation of the calibration jig 70 on the positioning device 60 is completed. When the controller 51 receives the information indicating completion of installation of the calibration jig 70 on the positioning device 60 from the input device 53 or etc., the controller 51 controls the second imaging device 40 to image the calibration jig 70.

Subsequently, the controller 51 performs known image processing (for example, pattern matching by normalized correlation) on the obtained image, identifies the positions of the points P on the calibration jig 70, and stores, in the storage device 54, the identified positions as second feature data 57.

On the other hand, the controller 21 of the first control unit 20 also operates as described above according to the first calibration data acquiring program 24*d*, controls the first imaging device 10 to image the calibration jig 70 installed on the positioning device 30, identifies the positions of the points P on the calibration jig 70 by image processing, and stores, in the storage device 24, the identified positions as first feature data 27.

The controller 51 of the second control unit 50 operates in accordance with the correction amount acquiring program 54*e*, communicates with the first control unit 20 of the first inspection device 1, receives the first feature data 27 stored in the storage device 24 of the first control unit 20, and stores the first feature data 27 in the storage device 54. Then the controller 51 performs correction so that the positions of the points P in the second feature data 57 match the positions of the corresponding points P in the first feature data 27, determines the image correction amount needed for the matching, and stores the correction amount in the storage device 54.

Figure 5:
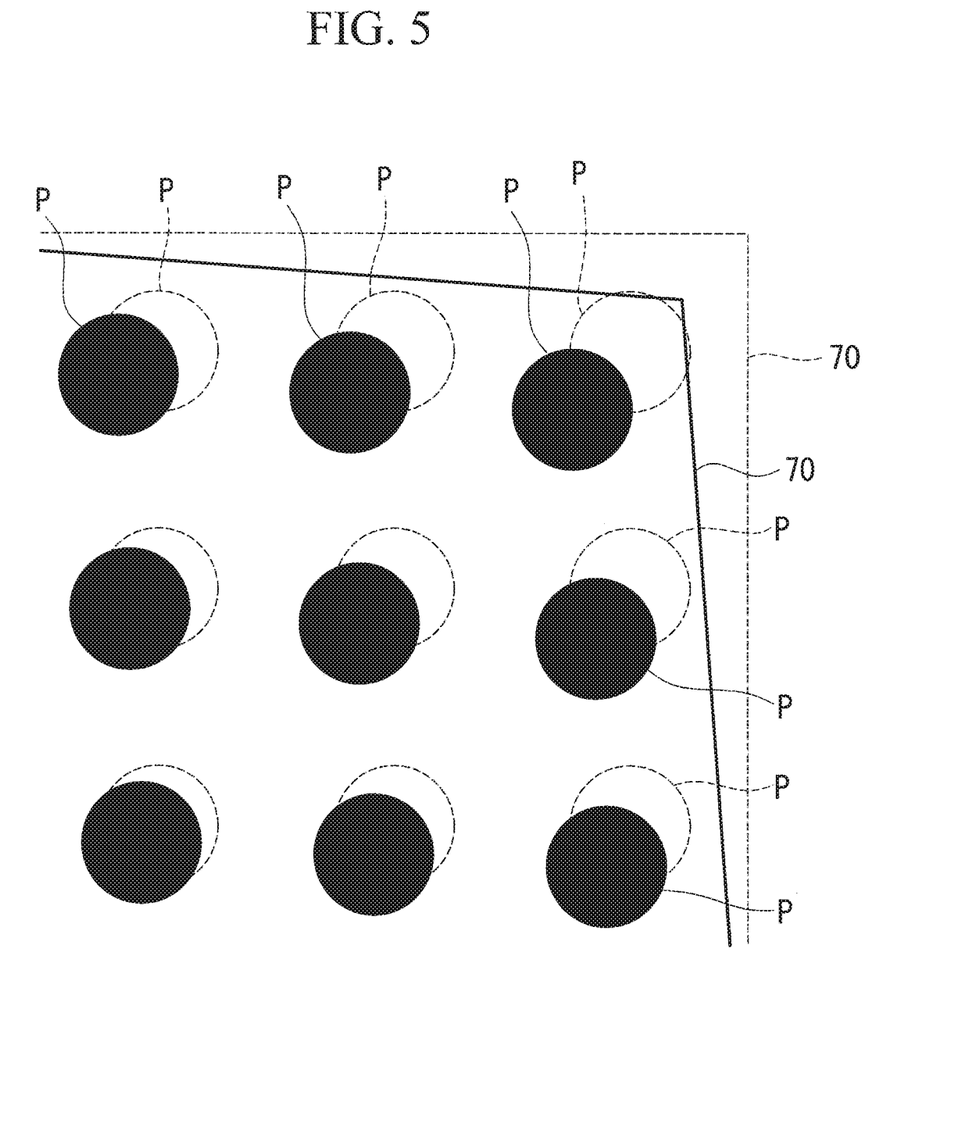
FIG. 5 is a diagram illustrating an example of a first feature data obtained by the inspection system of this embodiment.

For example, since a portion near a corner of the calibration jig 70 is placed on the end portion side of the viewing field of the first imaging device 10, as illustrated in FIG. 5, the actual positions (broken lines) of the points P differ from the positions (solid lines) of the points P in the obtained image due to the aberration of the optical system of the first imaging device 10 and the slight displacement between the positioning device 30 and the first imaging device 10.

On the other hand, a portion near a corner of the calibration jig 70 is also placed at one end of the viewing field of the second imaging device 40. Thus, as illustrated in FIG. 6, the actual positions (broken lines) of the points P differ from the positions (solid lines) of the points P in the obtained image due to the aberrations of the optical system of the second imaging device 40 and the slight displacement between the positioning device 60 and the second imaging device 40.

Figure 6:
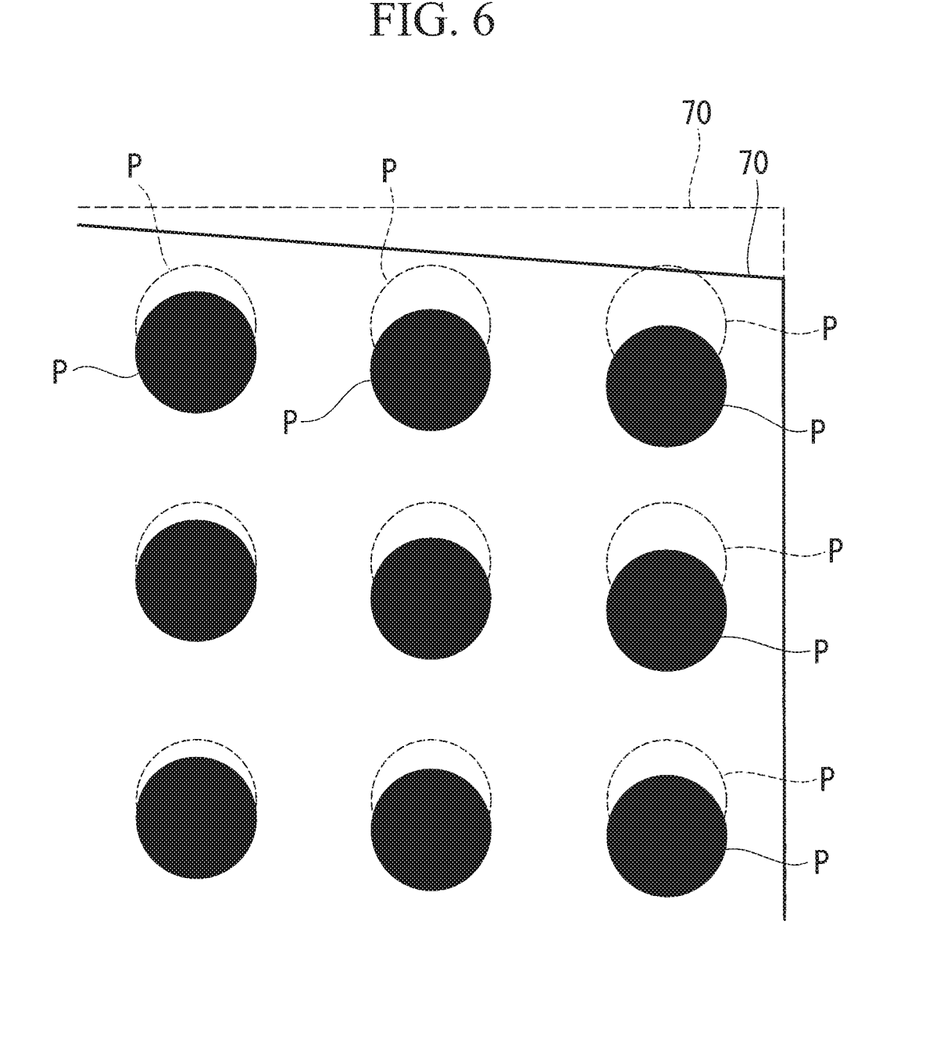
FIG. 6 is a diagram illustrating an example of a second feature data obtained by the inspection system of this embodiment.

It should be noted that FIG. 5 and FIG. 6 are samples prepared for explanation, and the displacement between the points P may be different from what actually it is.

Figure 7:
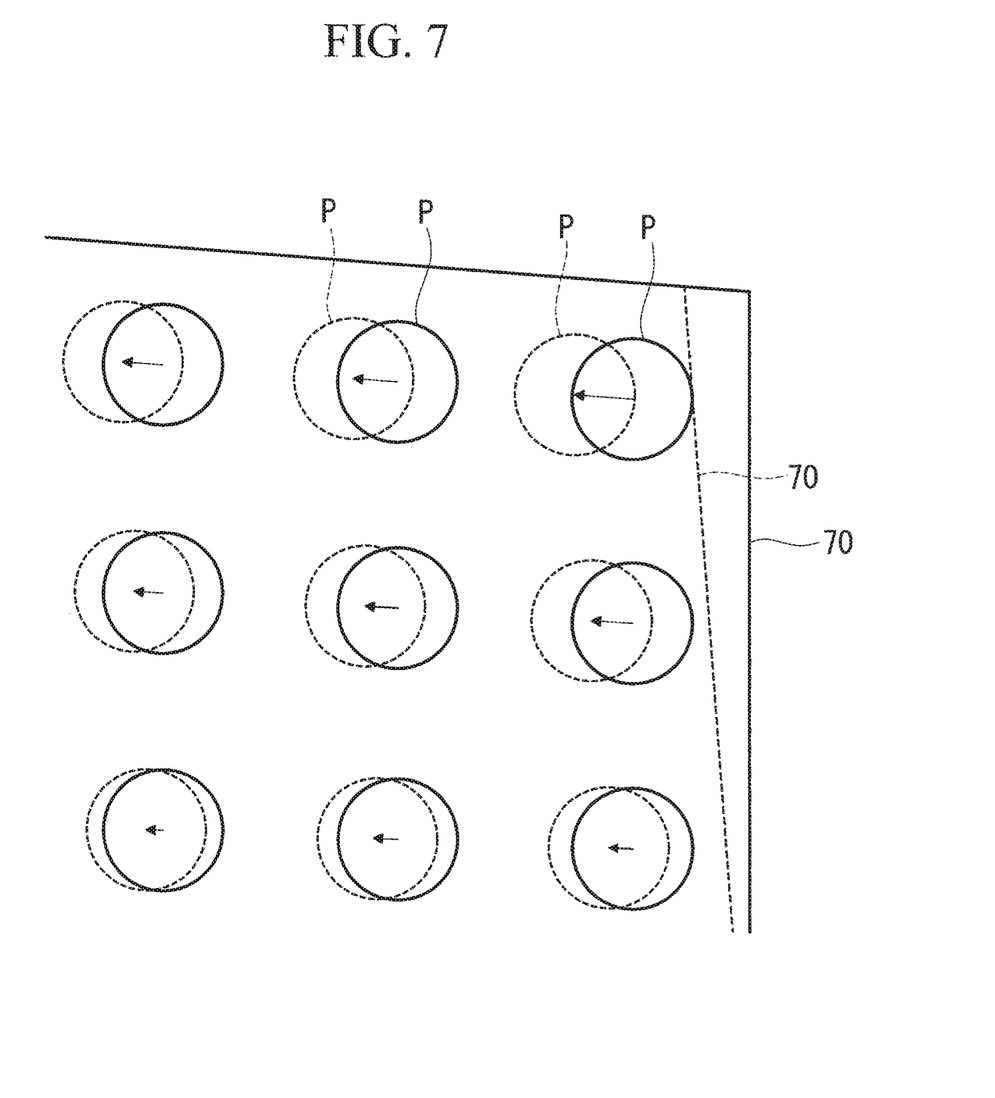
FIG. 7 is a diagram illustrating an example of correction of the second feature data carried out by the inspection system of this embodiment.

The image correction described above is not performed to bring the positions of the points P illustrated in FIGS. 5 and 6 back to actual accurate positions, but, as illustrated in FIG. 7, is performed to match the positions of the points P imaged by using the second imaging device 40 with the positions of the points P imaged by using the first imaging device 10.

Moreover, the controller 51 determines, by using known interpolation, the correction amount at each of the positions between the points P on the image, and stores, in the storage device 54, the obtained correction amounts in the form of a correction amount table in association with the positions in the image.

Then, the controller 51 of the second control unit 50 operates in accordance with the inspection program 54*b* and inspects the inspection subject O. At this stage, when a command to start inspection is input through the input device 53, the controller 51 controls the second imaging device 40 to image the inspection subject O positioned by the positioning device 60, generates a corrected image by deforming the image by using the correction amounts described above, and performs a known image processing on the corrected image so as to carry out inspection.

The corrected image after the deformation is an image that reflects the influence of the same aberrations and etc., as when the inspection subject O positioned by the positioning device 30 is imaged by the first imaging device 10. In this image, even a slight displacement difference between the imaging device 10 and the positioning device 30 present in the first inspection device 1 and a slight displacement difference between the imaging device 40 and the positioning device 60 present in the second inspection device 2 are cancelled.

Subsequently, the controller 51 inspects the corrected image through image processing. For example, the positions of the components on the inspection subject O are respectively identified, and it is determined whether each component passes or fails by comparing it with the pass sample images 25 and the failure sample images 26.

In this embodiment, the controller 51 operating in accordance with the correction amount acquiring program 54*e* obtains the image correction amounts that make the second feature data 57 match the first feature data 27, and the controller 51 operating in accordance with the inspection program 54*b* corrects, by using the correction amounts, the image of the inspection subject O obtained by using the second imaging device 40.

Thus, the image obtained by using the second imaging device 40 is an image that reflects the influence of the same aberrations etc., as when the inspection subject O is imaged by using the first imaging device 10 of the first inspection device 1. In this image, even a slight displacement difference between the imaging device 10 and the positioning device 30 present in the first inspection device 1 and a slight displacement difference between the imaging device 40 and the positioning device 60 present in the second inspection device 2 are cancelled. Thus, accurate inspection can be carried out by using the second inspection device 2 while using the same sample images as the first inspection device 1.

Note that in this embodiment, the positions of the points P are stored as the first feature data 27 in the storage device 24, and the positions of the points P are stored as the second feature data 57 in the storage device 54. Alternatively, it is possible to store image data, from which the positions of the points P can be derived, as the first feature data 27 in the storage device 24, and to store image data, from which the positions of the points P can be derived, as the second feature data 57 in the storage device 54.

When the appropriateness of the shape of the inspection subject O itself is to be inspected, the image correction amount necessary to match the positions (the meaning of which also includes the relative position) of the points P in the second feature data 57 with the positions (the meaning of which also includes the relative position) of the points P in the first feature data 27 is determined, and the image obtained by the second inspection device 2 is corrected by using this correction amount so that accurate inspection can be carried out.

In this embodiment, the first and second feature data 27 and 57 are position data of the points P of the calibration jig 70. Alternatively, the first and second feature data 27 and 57 may be data that indicates the brightness or color hue of pixels in the image.

In this case also, the controller 51 operating in accordance with the correction amount acquiring program 54e obtains the image correction amounts that match the second feature data 57 with the first feature data 27, and the controller 51 operating in accordance with the inspection program 54b corrects, by using the correction amounts, the image of the inspection subject O obtained by using the second imaging device 40.

Thus, the difference between the brightness or color hue of the image obtained by the second imaging device 40 and the actual brightness or color hue is the same as when the inspection subject O is imaged by using the first imaging device 10 of the first inspection device 1; thus, it is possible to accurately carry out inspection in the second inspection device 2 by using the same sample images as the first inspection device 1.

The first and second feature data 27 and 57 may be data that indicates the brightness or color hue of pixels in the image as well as the positions of the points P of the calibration jig 70.

The storage device 24 may store determination standards in addition to the pass sample images 25 and the failure sample images 26. The determination standards may be the values input through the input device 23 or design data such as CAD data, or the like.

Moreover, in this embodiment, the positioning devices 30 and 60 are used to fix the inspection subject O and the calibration jig 70. The positioning devices 30 and 60 may be robots, conveyers, and the like that bring the inspection subject O and the calibration jig 70 to below the imaging devices 10 and 40.

In this embodiment, the controller 21 operating in accordance with the sample image preparation program 24c stores, in the storage device 24, the pass sample images 25 and the failure sample images 26. Alternatively, for example, multiple inspection subjects O may be imaged by using the second imaging device 40, the obtained images may be corrected by using the correction amounts described above, pass/failure determination may be made by image processing, and the images may be associated with the pass/failure determination results and stored as new pass sample images 25 and new failure sample images 26.

In this embodiment, the storage device 24 of the first control unit 20 of the first inspection device 1 does not store a correction amount acquiring program; however, a correction amount acquiring program may be stored in the storage device 24 so that the first inspection device 1 can also function as a slave device. In this case, the second inspection device 2 may function as a master device.

In this embodiment, the controller 21 of the first inspection device 1 compares an image obtained by the first imaging device 10 but before correction of the aberration etc., with the pass sample images 25 and failure sample images 26, and carries out pass/failure determination of the components on the inspection subject O. Alternatively, the controller 21 of the first inspection device 1 may correct the aberrations and the like of the image obtained by the first imaging device 10, may compare the corrected image with the pass sample images 25 and failure sample images 26, and may carry out pass/failure determination of the components on the inspection subject O.

In this case, the pass sample images 25 and the failure sample images 26 are prepared by using the images whose aberrations and the like are already corrected. Moreover, the controller 51 of the second control unit 50 performs deformation by using the correction amounts on the image of the inspection subject O obtained by the second imaging device 40, and performs deformation by using the correction amounts used in correcting the aberrations etc., of the first imaging device 10.

The following aspects of the present invention are derived from the aforementioned disclosure.

A first aspect of the present invention provides an inspection system including: a first imaging device provided in a first inspection device; a first image processing means that processes an image of an inspection subject, which is positioned at a particular position in the first inspection device, so that the image can be used for inspection, the image being obtained by the first imaging device; a second imaging device provided in a second inspection device; a second image processing means that processes an image of an inspection subject, which is positioned at a particular position in the second inspection device, so that the image can be used for inspection, the image being obtained by the second imaging device; a first calibration data acquiring means that acquires a particular feature of a calibration jig, which is positioned at the particular position in the first inspection device, from an image of the calibration jig obtained by the first imaging device, and stores the particular feature as first feature data; a second calibration data acquiring means that acquires the particular feature of the calibration jig, which is positioned at the particular position in the second inspection device, from an image of the calibration jig obtained by the second imaging device, and stores the particular feature as second feature data; and an image correction amount acquiring means that corrects the image of the calibration jig obtained by the second imaging device so that the second feature data matches the first feature data, and acquires a correction amount to correct the image, wherein the second image processing means corrects the image of the inspection subject by using the correction amount.

According to this aspect, the image correction amount acquiring means acquires the image correction amount with which the second feature data matches the first feature data, and the second image processing means of the second inspection device uses this correction amount to correct the image of the inspection subject obtained by the second imaging device.

Thus, the image obtained by using the second imaging device is an image that reflects the influence of the same aberration etc., as when the inspection subject is imaged by using the first imaging device of the first inspection device. In this image, even a slight displacement difference between the imaging device and the positioning device present in the first inspection device and the second inspection device is canceled. Thus, accurate inspection can be carried out by using the second inspection device while using the same sample images as the first inspection device.

In the aspect described above, the calibration jig may have a plurality of feature points, the first feature data may be position data of the plurality of feature points in the image of the calibration jig obtained by the first imaging device, and the second feature data may be position data of the plurality of feature points in the image of the calibration jig obtained by the second imaging device.

In the aspect described above, the first feature data may be data that indicates a brightness or a color hue of a particular pixel in the image of the calibration jig obtained by the first imaging device, and the second feature data may be data that indicates a brightness or a color hue of a particular pixel in the image of the calibration jig obtained by the second imaging device.

A second aspect of the present invention provides a method for correcting an image for inspection, the method including: a first calibration data acquiring step of obtaining an image of a calibration jig, which is positioned at a particular position in a first inspection device, by using a first imaging device of the first inspection device, and acquiring, as first feature data, a particular feature of the calibration jig in the obtained image; a second calibration data acquiring step of obtaining an image of the calibration jig, which is positioned at a particular position in a second inspection device, by using a second imaging device of the second inspection device, and acquiring, as second feature data, the particular feature of the calibration jig in the obtained image; an image correction amount acquiring step of correcting the image of the calibration jig obtained by the second imaging device so that the second feature data matches the first feature data, and acquiring a correction amount for correcting the image; and an inspection image correcting step of correcting, by using the correction amount, the image of an inspection subject, which is positioned at the particular position in the second inspection device, obtained by the second imaging device.

According to this aspect, the image correction amount with which the second feature data matches the first feature data is acquired in the image correction amount acquiring step, and the image of the inspection subject obtained by the second imaging device is corrected by the second inspection device by using this correction amount.

Thus, the image obtained by using the second imaging device is an image that reflects the influence of the same aberration etc., as when the inspection subject is imaged by using the first imaging device of the first inspection device. In this image, even a slight displacement difference between the imaging device and the inspection subject present in the first inspection device and the second inspection device is canceled. Thus, accurate inspection can be carried out by using the second inspection device while using the same sample images as the first inspection device.

According to the aforementioned aspects, the same sample images can be used in a plurality of inspection devices.

REFERENCE SIGNS LIST 1 first inspection device
2 second inspection device
10 first imaging device
20 first control unit
21 controller
22 display device
23 input device
24 storage device
24a system program
24b inspection program
24c sample image preparation program
24d first calibration data acquiring program
25 pass sample image
26 failure sample image
27 first feature data
30 positioning device
40 second imaging device
50 second control unit
51 controller
52 display device
53 input device
54 storage device
54a system program
54b inspection program
54c sample image preparation program
54d second calibration data acquiring program
54e correction amount acquiring program
60 positioning device
70 calibration jig
O inspection subject
P point

The invention claimed is:

1. An inspection system comprising:
a first imaging device provided in a first inspection device;
a first controller that processes a first image of a first inspection subject, which is positioned at a particular position in the first inspection device, so that the first image can be used for inspection, the first image being obtained by the first imaging device;
a second imaging device provided in a second inspection device;
a second controller that processes a second image of a second inspection subject, which is positioned at a particular position in the second inspection device, so that the second image can be used for inspection, the second image being obtained by the second imaging device;
wherein the first controller conducts a first calibration data acquiring process that acquires a particular feature of a calibration jig, which is positioned at the particular position in the first inspection device, from a first image of the calibration jig obtained by the first imaging device, and stores the particular feature as first feature data;
wherein the second controller conducts:
a second calibration data acquiring process that acquires the particular feature of the calibration jig, which is positioned at the particular position in the second inspection device, from a second image of the calibration jig obtained by the second imaging device, and stores the particular feature as second feature data;
an image correction amount acquiring process that corrects the second image of the calibration jig obtained by the second imaging device so that the second feature data matches the first feature data, and acquires a correction amount to correct the second image; and
wherein the second controller corrects the second image of the second inspection subject by using the correction amount.

2. The inspection system according to claim 1, wherein:
the calibration jig has a plurality of feature points; and
the first feature data is position data of the plurality of feature points in the first image of the calibration jig obtained by the first imaging device, and the second feature data is position data of the plurality of feature points in the second image of the calibration jig obtained by the second imaging device.

3. The inspection system according to claim 1, wherein the first feature data indicates a brightness or a color hue of a particular pixel in the first image of the calibration jig obtained by the first imaging device, and the second feature data indicates a brightness or a color hue of a particular pixel in the second image of the calibration jig obtained by the second imaging device.

4. A method for correcting an image for inspection, the method comprising:
- a first calibration data acquiring step of obtaining a first image of a calibration jig, which is positioned at a particular position in a first inspection device, by using a first imaging device of the first inspection device, and acquiring, as first feature data, a particular feature of the calibration jig in the first image;
- a second calibration data acquiring step of obtaining a second image of the calibration jig, which is positioned at a particular position in a second inspection device, by using a second imaging device of the second inspection device, and acquiring, as second feature data, the particular feature of the calibration jig in the second image;
- an image correction amount acquiring step of correcting the second image of the calibration jig obtained by the second imaging device so that the second feature data matches the first feature data, and acquiring a correction amount for correcting the second image of the calibration jig; and
- an inspection image correcting step of correcting, by using the correction amount, an image of an inspection subject, which is positioned at the particular position in the second inspection device, obtained by the second imaging device.

5. The method for correcting an image for inspection according to claim 4, wherein:
- the calibration jig has a plurality of feature points; and
- the first feature data is position data of the plurality of feature points in the first image of the calibration jig obtained by the first imaging device, and the second feature data is position data of the plurality of feature points in the second image of the calibration jig obtained by the second imaging device.

6. The method for correcting an image for inspection according to claim 4, wherein the first feature data indicates a brightness or a color hue of a particular pixel in the first image of the calibration jig obtained by the first imaging device, and the second feature data indicates a brightness or a color hue of a particular pixel in the second image of the calibration jig obtained by the second imaging device.

7. The inspection system according to claim 1, wherein the second controller is configured to correct the second image of the second inspection subject so as to obtain an image of the second inspection subject possessing an aberration which is the same as an aberration in a case where an image of the second inspection subject is obtained by the first imaging device of the first inspection device.

8. The method for correcting an image for inspection according to claim 4, further comprising correcting a second image of a second inspection subject so as to obtain an image of the second inspection subject possessing an aberration which is the same as an aberration in a case where an image of the second inspection subject is obtained by the first imaging device of the first inspection device.

* * * * *